April 27, 1926.

H. E. CLARKE 1,582,636

FOOT AND LAST MEASURING MACHINE

Filed Feb. 9, 1924

H. E. CLARKE 1,582,636

FOOT AND LAST MEASURING MACHINE

Filed Feb. 9, 1924

INVENTOR:
Harold E. Clarke
By Franklin F. Phillips, Jr.
ATTORNEY:

April 27, 1926.

H. E. CLARKE 1,582,636

FOOT AND LAST MEASURING MACHINE

Filed Feb. 9, 1924  4 Sheets-Sheet 3

INVENTOR=
Harold E. Clarke
By Franklin F. Hincley
ATTORNEY=

April 27, 1926.
H. E. CLARKE
1,582,636
FOOT AND LAST MEASURING MACHINE
Filed Feb. 9, 1924
4 Sheets-Sheet 4
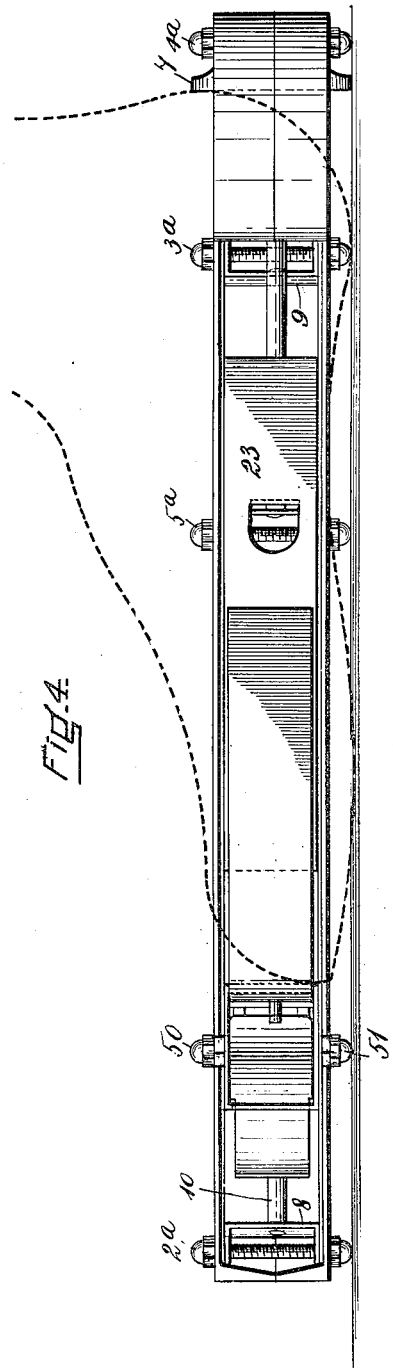
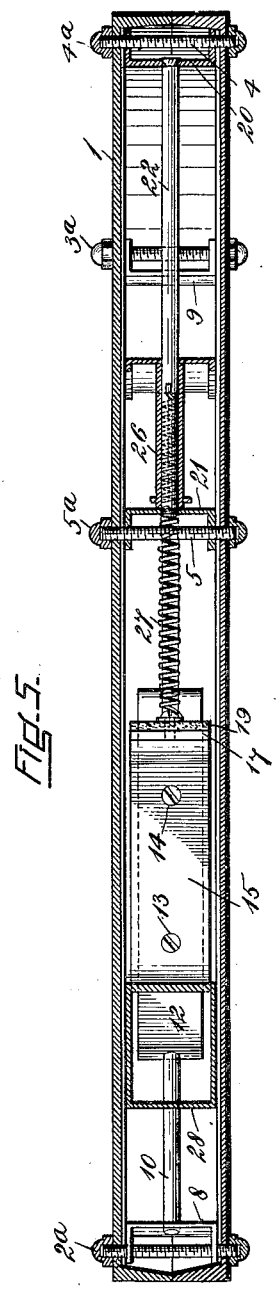
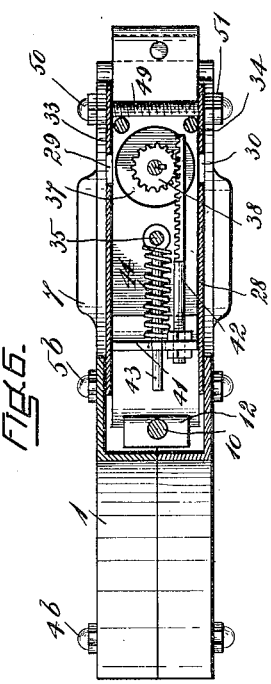
INVENTOR=
Harold E. Clarke
By Franklin T. Phillips,
ATTORNEY=

Patented Apr. 27, 1926.

1,582,636

UNITED STATES PATENT OFFICE.

HAROLD E. CLARKE, OF SOMERVILLE, MASSACHUSETTS.

FOOT AND LAST MEASURING MACHINE.

Application filed February 9, 1924. Serial No. 691,802.

*To all whom it may concern:*

Be it known that I, HAROLD E. CLARKE, a citizen of the United States, residing at Somerville, in the county of Middlesex and Commonwealth of Massachusetts, have invented certain new and useful Improvements in Foot and Last Measuring Machines, of which the following is a specification.

The object of my invention has been to produce a machine for measuring the human foot, or lasts upon which shoes are made, in terms of shoe size, both as to length and width, and it has been my special object to produce such a device which shall be simple, accurate, rapid and easy of operation.

My device may be best understood by reference to the accompanying drawings, in which—

Fig. 4 is a side view of my device when in the position shown in Figs. 2 and 3.

Fig. 5 is a vertical section on line 5—5 of Fig. 3.

Fig. 6 is a vertical section on line 6—6 of Fig. 3.

Figure 1:
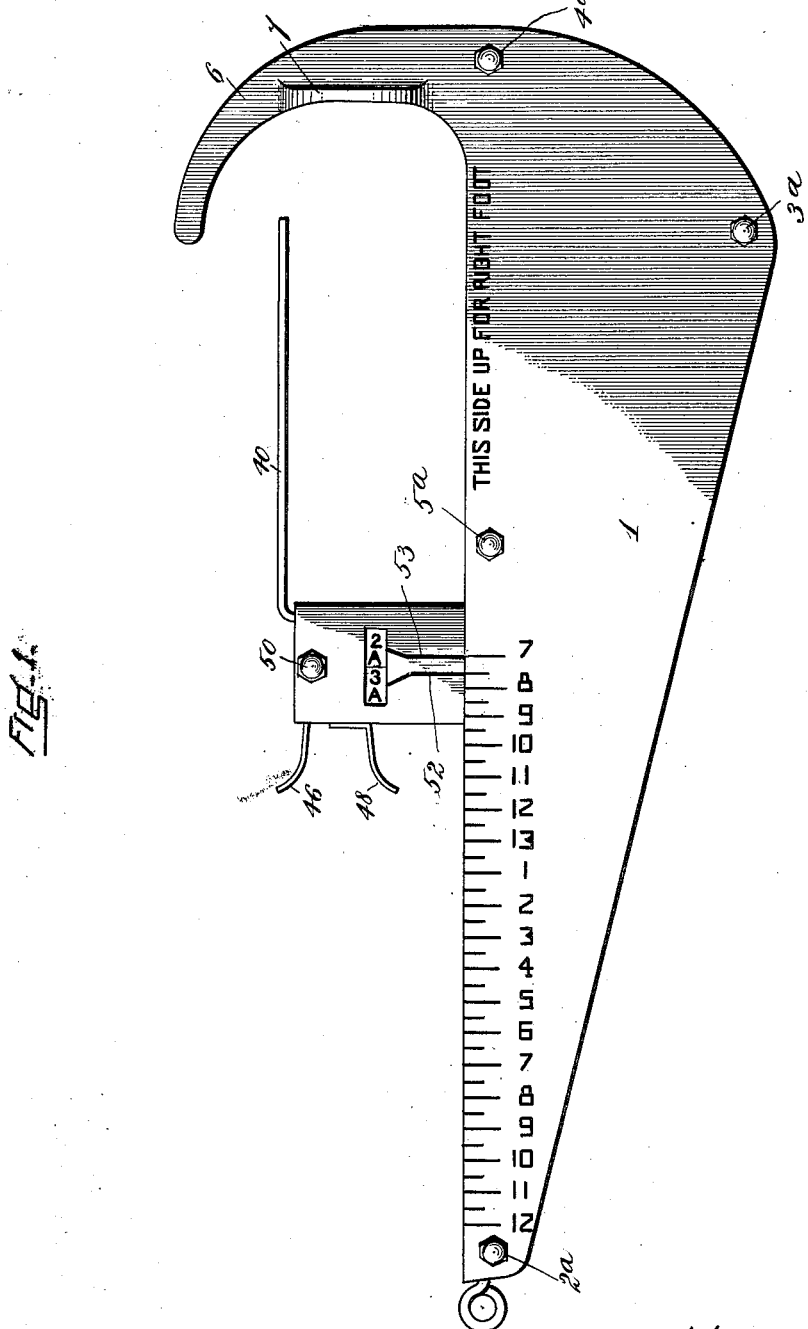
Fig. 1 is a top view of my device when in position for measuring the right foot.

Referring now more specifically to the drawing 1 is a casing composed of two like halves held together by bolts 2, 3, 4 and 5 provided with nuts 2ª, 3ª, 4ª and 5ª respectively on one end thereof and nuts 2ᵇ, 3ᵇ, 4ᵇ and 5ᵇ respectively on the other end thereof. The casing 1 has a curved extension 6 arranged to embrace the heel of the foot or last to be measured and each side of said extenson 6 is provided with an integral fin or plate 7 adapted to give further support to the back of the heel.

Figure 2:
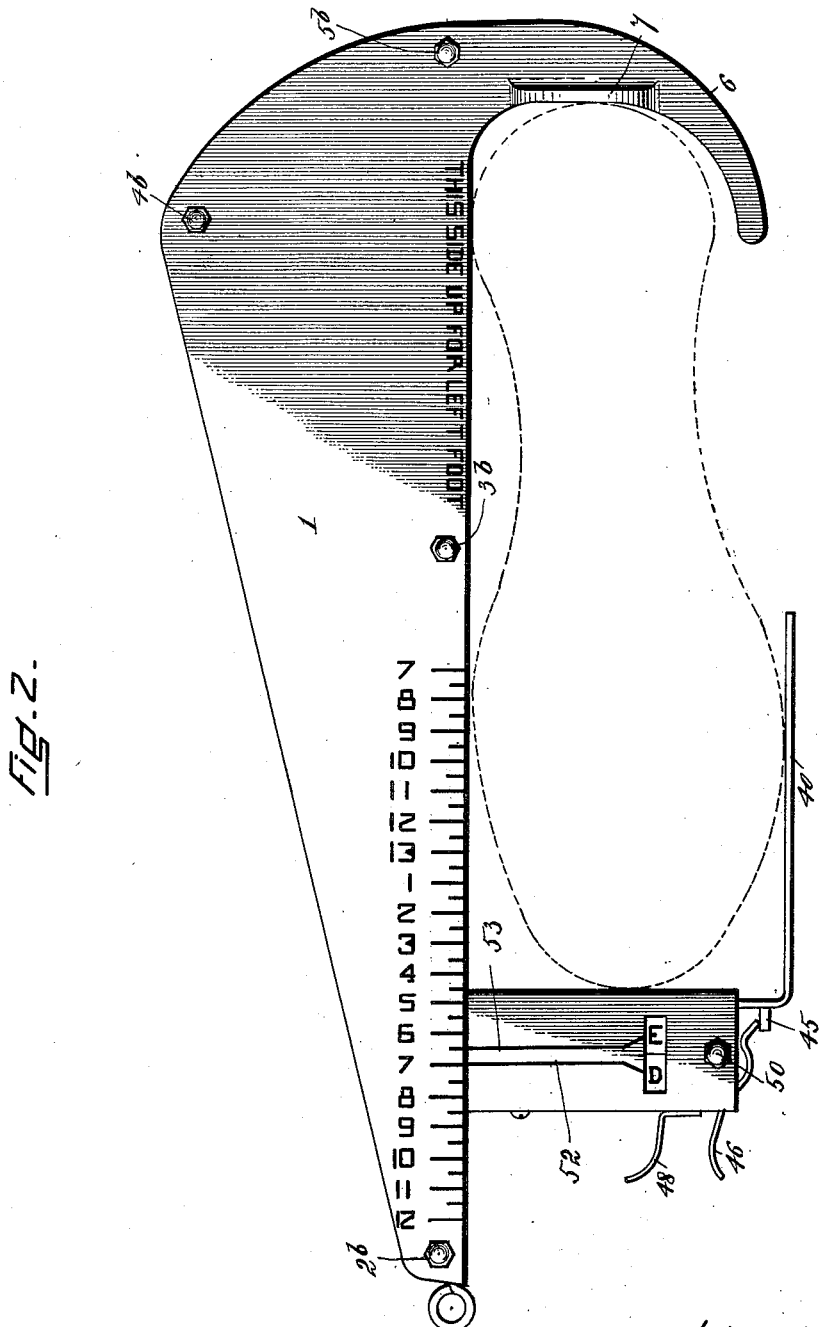
Fig. 2 is a top view of my device when in position for measuring the left foot, indicated therein by dotted lines, the movable length and width gauging members being somewhat extended by the foot.

Along the inner edge of the surface of each side of the casing 1 is placed a conventional length measurement scale as shown in Figs. 1 and 2, the scale running from 7 to 13 to indicate children's sizes and from 1 to 12 to indicate adult sizes.

It will be noted that the edge of the casing along which the length scales are placed extends at a right angle to the heel supporting fins 7 and these length scales are suitably positioned with respect to distance from said heel supporting parts in a manner to be hereinafter specified.

Figure 3:
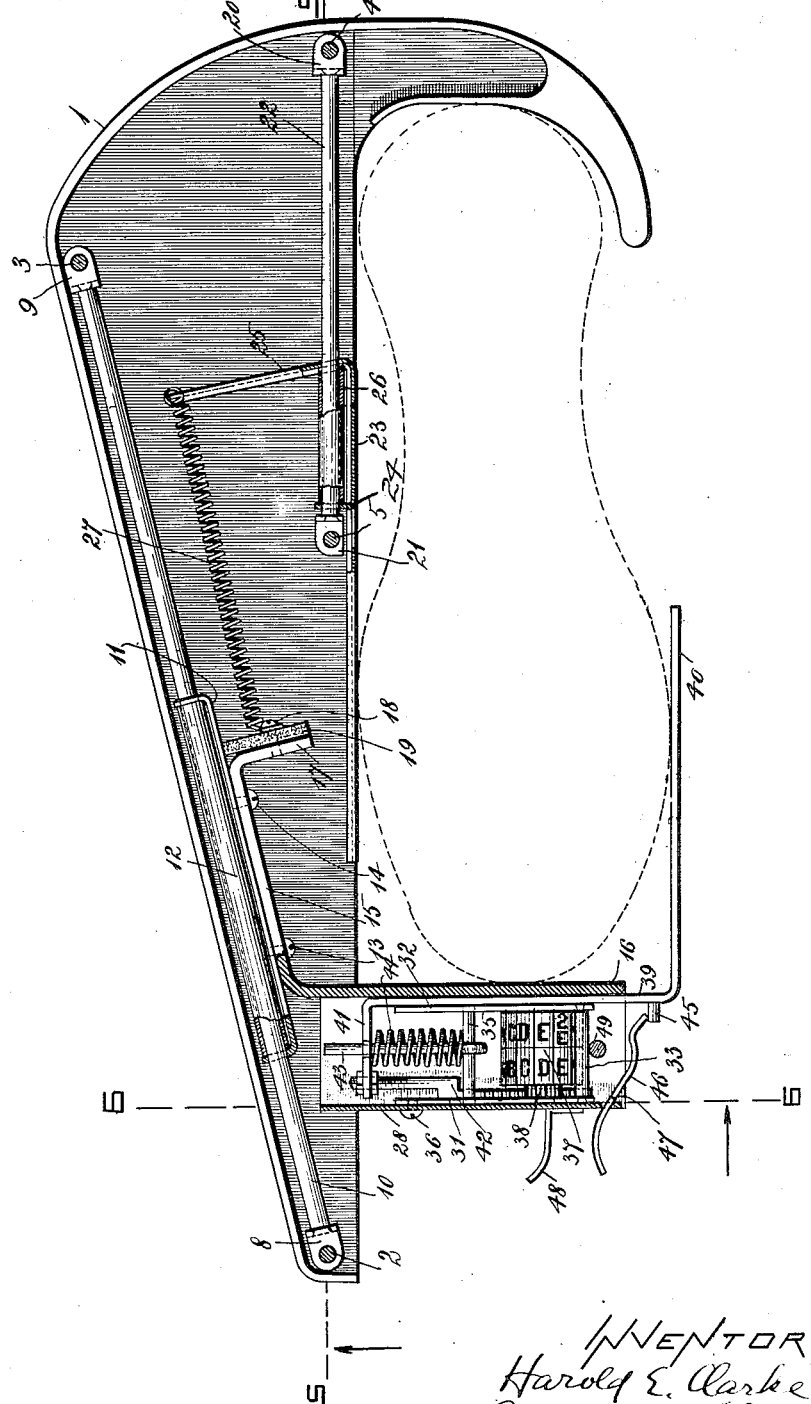
Fig. 3 is a top view of my device in the position of Fig. 2 with top casings removed to disclose internal mechanisms.

Mounted between brackets 8 and 9 (Fig. 3), which are retained in place respectively by bolts 2 and 3, is a guide-rod 10 upon which is slidably mounted a bracket 11 the extremities of which embrace and are secured to a sleeve 12. Attached to bracket 11 by means of screws 13 and 14 is a plate 15 which is bent to form an extension 16 which projects through the open side of the casing 1 so as to form a toe-plate. It will be noted that this extension 16 extends at a right angle to that side of the casing 1 through which it projects. The plate 15 has also a short extension 17 bent at a right angle thereto forming an arm upon which is secured by means of screw 18 a fibre plate 19 which has a slidable bearing upon the opposite inner surfaces of casing 1, which bearing tends to prevent the toe-plate 16 from rocking.

The guide-rod 10 extends at an angle to the open side of the casing 1, through which the toe-plate 16 projects, such that a forward movement of the toe-plate 16 will cause it to be projected outwardly the distance of a width size for each unit of length size that the toe-plate is moved forward.

Mounted on brackets 20 and 21, secured respectively by bolts 4 and 5, is a second guide-rod 22 upon which is slidably supported a plate 23 by means of a lug 24 and an integral angular extension, or arm 25, both of which parts have fastened between them a sleeve 26, which surrounds the rod 22. It will be noted that the guide rod 22 lies parallel to the open side of the casing 1. A coil spring 27 is attached at one end to the arm 25 and at the other end to the screw 18 on the arm 17. The plate 23 is a slidable inner side-plate affording a contact for the ball joint of a foot to be measured in a manner to be hereinafter described.

The toe-plate 16 has fastened to its forward side a rectangular casing 28 which is provided with opposite holes 29 and 30 (see Fig. 6). Within the casing 28 is a frame comprising plates 31 and 32 spaced apart by studs 33, 34 and 35. The frame is held in position in casing 28 by means of the screw 36. Mounted between plates 31 and 32 and between holes 29 and 30 is a roller 37 bearing a pinion 38. Each half of the surface of the roller 37 is marked on the side nearer the toe-plate 16 with a scale of shoe width, sizes running from A³ to E² beneath which is a scale running from A² to E. (See Fig. 3.) The holes or slots 29 and 30 each permit the reading of two like groups of shoe width sizes arranged in sequence as A³ and A² or A² and A or A and B, etc. (See Fig. 1.)

Slidably mounted between the toe-plate 16 and plate 32 is a plate 39 which is provided with an integral part bent at right angles thereto forming a side-plate 40. The end of plate 39, opposite to that forming the side-plate 40, is bent at right angles in the opposite direction forming an arm 41 which has fastened to its extremity a rack bar 42 arranged to engage the pinion 38. The stud 35 carries a rod 43 which extends through a hole in the arm 41 and between the arm 41 and the stud 35 is a coil spring 44 which surrounds the rod 43 and which tends normally to thrust the plate 39 inwardly until it comes to rest with the side-plate 40 in contact with the edge of toe-plate 16. With the side plate 40 in this position the roller 37 is so arranged that a reading of the scales thereon through slots 29 and 30 will show A³ and A².

The plate 39 is provided with a lug 45 against which contacts the tip of a lever 46 pivoted at 47 and projecting through the side of casing 28. For convenience in manipulating the lever 46 a complementary thumb piece 48 is attached to the side of casing 28 opposite the lever 46 so that these parts may be pinched together, thus permitting the operator to extend the side-plate 40 while the foot or last to be measured is being placed in position. The lever 46 is kept from contact with the roller 37 by means of the studs 33 and 34. Upon a bolt 49 extending between and through the top and bottom of the casing 28 are nuts 50 and 51 at each extremity. The device as a whole when turned for either side will rest evenly upon these nuts together with those which bind together the two halves of the casing 1.

Upon both top and bottom of the casing 28 are parallel lead lines 52 and 53 which diverge toward the centres of those spaces in the slots 29 and 30 wherein appear respectively the consecutive narrower and wider width size markings. The lead lines 52 and 53 are spaced apart when parallel the distance of one half of a length size and are thus arranged to register with markings on the length size scales appearing on each side of the casing 1, which are marked with gradations showing half sizes.

The length size scales are so positioned upon the casing 1 that when a foot or last of a given length size is placed between the heel plate 7 and the toe plate 16 the lead line 53 will register with that mark upon the length scale which indicates that size.

It is of course well known that according to the present day standard of shoe-size measurement a given width-size increases proportionately with increase in length-size. An A width is accordingly, and for example, one unit of width-size wider in a size 7 shoe than is an A width in a size 6 shoe. With this fact in mind the following description of the operation of my device will be more readily understood, as it will be apparent that as the toe plate 16 with its attached parts is caused to slide forward, or toward the positions indicating the greater length-sizes, it will be thrust outward, because of its mounting on the rod 12, a distance equal to a width-size unit for each unit of length-size distance that it is so moved forward. The reverse movement of the toe-plate 16 will have the reverse effect. Hence the stated relationship of width, as measured between the side-plate 40 and the straight side of casing 1, and length as measured between the heel-plate 7 and the toe-plate 16, is maintained throughout.

To measure the foot the operator first pulls the toe-plate outward to a length position greater than that to be measured and manipulates the lever 46 so as to extend the side-plate. The foot is then placed between the heel-plate 7 and toe-plate 16 and both foot and measuring device are allowed to rest upon the floor. If the left foot is being measured that side of the machine which is shown in Fig. 2 is uppermost as the straight inner side of the foot must be along the straight side of the casing 1. If the right foot is being measured the machine is of course turned over upon its other side. The operator next moves the toe-plate against the great toe so that the machine holds the foot lightly but firmly embraced between the heel-plate 7 and the toe-plate 16. The lever 46 is then released allowing the side-plate 40 to be drawn in against the foot by the tension of the spring 44. The sliding plate 23 will meanwhile have assumed such a position that the ball joint of the foot may contact with it and the foot will be lightly but firmly embraced between the side-plate 40 and the plate 23. If the foot extends the side-plate 40 beyond its normal setting this will have caused a movement of the rack bar 42 thereby rotating the roller 37. The rack bar 42 and pinion 38 are in such relation that a movement of the side plate 40 the distance of a unit of width-size will cause an appropriate degree of rotation to the roller 37 which bears the width size markings.

With the device at rest and embracing the foot as stated above, the operator may now read simultaneously the length and width indications at each extremity of the head line 53.

Many fitters of shoes make a practice of allowing an added length of a half size and, when so doing, reducing the width by a size. Shoes are often sized and marked to meet this condition. For the convenience of those so fitting shoes I have added to the roller 37 the width-size scales indicated by the lead line 52 which also leads to a half size larger position on the length scale.

My device has the advantages of simplicity, lightness and ease of operation. As it adjusts itself, to a great extent, automatically to the foot it presents no problem of exactly positioning the foot with respect to the machine. Hence no expert skill is required to operate the machine. The length and width readings are quickly, easily and simultaneously taken.

Having thus fully described my invention, I claim:

1. In a device of the character specified the combination of a heel-plate, a toe-plate, a support provided with a scale of shoe length-sizes and a slantingly disposed guide-member, whereon said toe-plate is slidably mounted in a manner whereby it will, upon sliding, be moved laterally a distance equal to a shoe width-size for each unit of shoe length-size that it is slid along said guide member and support, a side-plate slidably mounted upon said toe-plate, a width-size indicating means and means whereby said width-size indicating means may be operated by the sliding movement of said side-plate.

2. In a device of the character specified the combination of a slidable toe-plate, a support for said toe-plate whereon it is arranged to slide, said support being provided on both top and bottom with a scale of shoe length-sizes, a heel-plate offset from said support at substantially a right angle to one side of said support, a guide member for said slidable toe-plate which guide member is slantingly disposed with respect to said side of said support whereon said toe-plate slides in a manner whereby said toe-plate is moved laterally a distance equal to one unit of shoe-width-size for each unit of shoe length-size that it is slid along said guide member, a side-plate slidably mounted with respect to said toe-plate, width-size indicating means arranged to operate upon both top and bottom of the device, said device being reversible in a manner whereby it may be turned over so that said heel plate lies to either the left or right of said side of said support which extends at a right angle to said heel-plate, and means whereby said width-size indicating means may be operated by the sliding movement of said side-plate.

3. In a device of the character specified the combination of a casing provided with an extension forming a heel-plate, one side of said casing being perpendicular to said heel-plate and provided on both top and bottom with a scale of shoe length-sizes, a toe-plate, a guide within said casing whereon said toe-plate is slidably mounted, said guide being arranged at an angle to said side of said casing such that when said toe-plate is slid thereon it will be moved laterally a distance equal to a shoe width-size for each unit of shoe length-size that it is caused to slide upon said guide, a side-plate slidably mounted on said toe-plate, a roller provided with two like sets of scales of width-sizes, a pinion attached to said roller, a rack meshing with said pinion, means whereby said rack is connected to said side-plate and a casing attached to said toe-plate enclosing said roller, said pinion and said rack, there being a slot in the bottom and a slot in the top of said casing through each of which slots a scale marking upon said roller may be read.

4. In a device of the character specified the combination of a casing provided with an extension forming a heel-plate, one side of said casing being perpendicular to said heel-plate and provided on both top and bottom with a scale of shoe length-sizes, a toe-plate a guide within said casing whereon said toe-plate is slidably mounted, said guide being arranged at an angle to said side of said casing such that when said toe-plate is slid thereon it will be moved laterally a distance equal to a shoe width-size for each unit of shoe length-size that it is caused to slide upon said guide, a side-plate slidably mounted on said toe-plate, a second side-plate slidably mounted in said casing and arranged to slide longitudinally, means whereby said second side-plate may be actuated by the movement of said toe-plate, width-size indicating means and means whereby said width-size indicating means may be operated by the movement of said side-plate mounted on said toe-plate.

In witness whereof I have hereunto affixed my signature.

HAROLD E. CLARKE.